Sept. 30, 1941. H. C. SCHUTT 2,257,198
METHOD AND APPARATUS FOR CONVERSION OF HYDROCARBON GASES
Filed Aug. 5, 1936
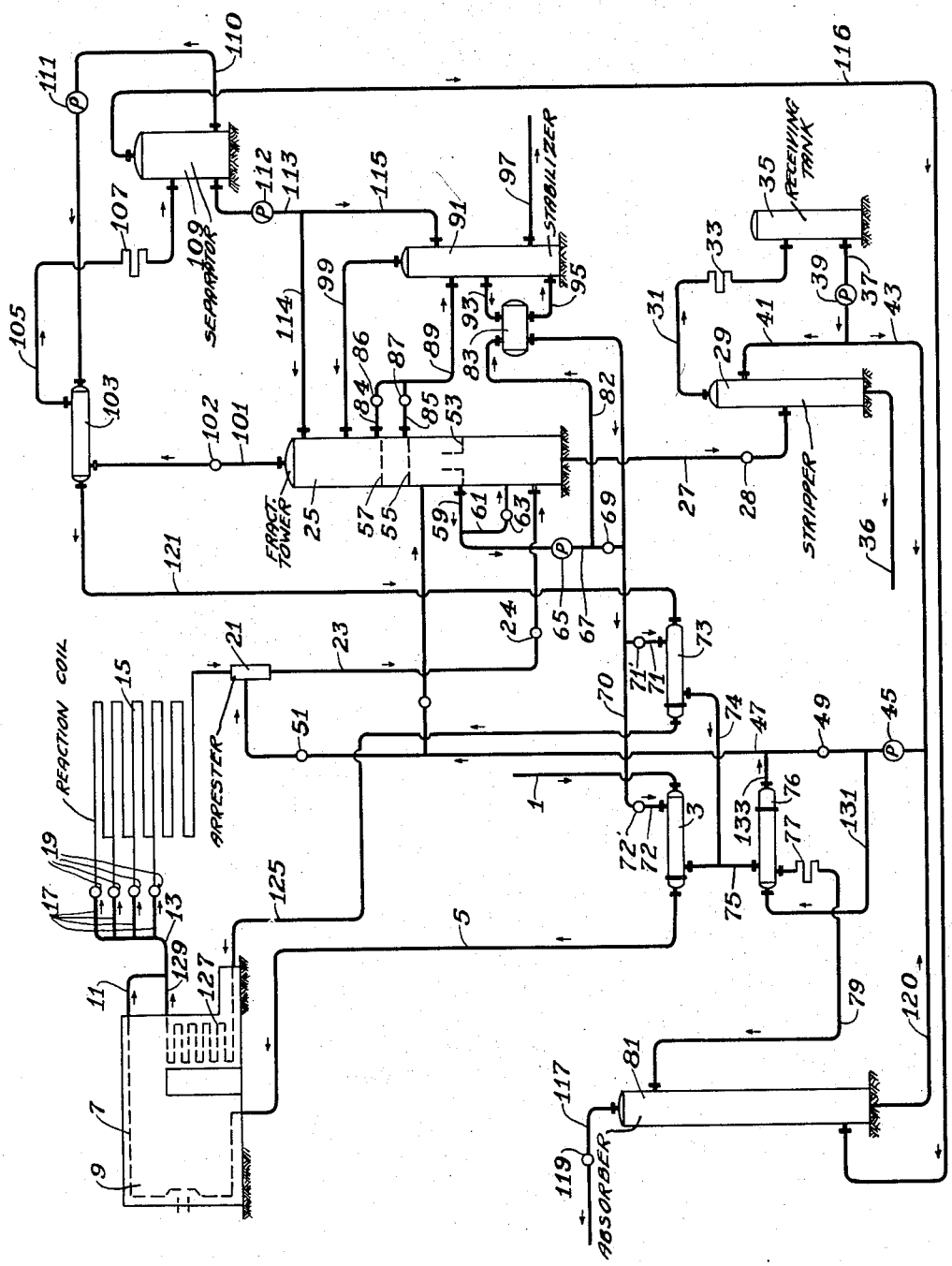
INVENTOR
*Hermann C. Schutt*
BY *Edward H. Lang*
ATTORNEY Patented Sept. 30, 1941

2,257,198

UNITED STATES PATENT OFFICE 2,257,198

METHOD AND APPARATUS FOR CONVERSION OF HYDROCARBON GASES

Hermann C. Schutt, North Tarrytown, N. Y., assignor to The Pure Oil Company, Chicago, Ill., a corporation of Ohio Application August 5, 1936, Serial No. 94,386

3 Claims. (Cl. 196—10)

This invention relates to method and apparatus for converting predominantly or wholly saturated gases to liquid hydrocarbons boiling chiefly within the gasoline range. More particularly the invention contemplates conversion of saturated gases to liquids in a plurality of steps, in the first of which the gases are cracked under conditions to convert a substantial portion of the gases to olefinic hydrocarbons and the olefins are subsequently polymerized to liquids in one or more steps.

In order to obtain high yields of motor fuel distillate from unsaturated hydrocarbon gases, it is essential that the conversion of gases does not exceed 50% per pass. As a result of the incomplete conversion, considerable quantities of gas must be recycled to the polymerization zone in order to obtain suitable yields.

In accordance with my invention, I propose to subject the predominantly saturated gases to cracking in a separate high temperature coil at elevated pressures and mix the cracked gases, leaving the coil at high temperature, with preheated gases rich in olefins so that the resulting mixture will be at a suitable polymerizing temperature and pressure, and then to pass the mixture into a polymerizing zone. I have found that at pressures of the order of 300-350 pounds per square inch, saturated gases can be cracked to yield a large amount of unsaturates without forming excessive amounts of liquid and/or tar. The reaction products are then chilled with rich absorber oil and the partially cooled products are fractionated to separate the liquefiable portions of the gas separated from the rich oil and reaction products. The liquefied gases are pumped to a preheating coil where the temperature of the gas is raised sufficiently to give a suitable polymerizing temperature when mixed with the cracked gases. The uncondensed portion of the gas separated from the reaction products and rich absorber oil may be recycled to the absorber and the undissolved fraction of the gases eliminated from the system.

One of the objects of my invention is to provide method and apparatus for simultaneously cracking predominantly saturated gases and polymerizing unsaturated gases with low fuel consumption.

A further object of my invention is to subject saturated or predominantly saturated hydrocarbons to high temperature for a short time to form methyl, ethyl and other alkyl radicals, and to immediately subject the activated gas in admixture with olefin-containing gases to conditions of polymerization and alkylation.

Another object of my invention is to provide method and apparatus for obtaining a high yield of liquid hydrocarbons boiling within the motor fuel range from predominantly saturated hydrocarbon gases.

A still further object of my invention is to provide method and apparatus for converting predominantly saturated hydrocarbon gases to liquid hydrocarbons at elevated pressures and in a plurality of steps in a manner to avoid the necessity of compressing gas subsequent to charging the gas to the cracking zone.

Still another object of my invention is to crack saturated gases under such super-atmospheric pressures as to avoid excessive formation of liquid and tar and under pressures that are suitable for polymerization of the cracked gases.

Other objects and advantages of my invention will be apparent from the following description considered in conjunction with the accompanying drawing, of which, The figure is a diagrammatic elevational view of apparatus suitable for carrying out the invention.

Referring to the drawing, numeral 1 indicates the line through which predominantly saturated or wholly saturated hydrocarbon gases are charged to the system. The gases pass from the inlet of line 1 through heat exchanger 3 and line 5 to heating and cracking coil 7 located in a furnace 9. The heating coil 7 is preferably located in the radiant heat zone of the furnace in order that the gases passing through may be heated to a sufficiently high temperature. The gases may be passed through the coil 7 at coil outlet pressures ranging from atmospheric to 400 pounds per square inch but preferably at pressures of from 200-400 pounds per square inch and may issue from the coil at temperatures ranging from 1200°-1500° F. after having been retained therein for a very short period of time. The reaction products leave the heating coil 7 through the line 11 and pass into the line 13, from which the gases may be passed into reaction coils 15 by means of one or more of the lines 17 controlled by valves 19. By providing a plurality of lines 17, the products passing through the reaction coils may be subjected to any desirable period of reaction in the coils 15. For example, at higher temperatures and lower pressures, it may be desirable to use a shorter reaction coil than would be desirable with lower temperatures and higher pressures. The reaction coils 15 may be of the same diameter as the heating coil 7 but are preferably of larger diameter in order to provide a reduction in gas velocity and increased reaction time. The reaction coils may be suitably insulated against heat loss or provided with suitable heat exchange means.

The products leaving the reaction coils 15 pass into an arrester 21 without reduction in pressure other than that which occurs through line losses, where they are contacted with cool oil from a source later to be described. In the arrester the products may be chilled to a temperature below 600° F. and preferably from 400°–500° F. From the arrester the chilled reaction products, together with the cooling liquid, pass through the line 23 controlled by valve 24 into the lower portion of a fractionating tower 25. The pressure under which tower 25 is maintained will depend on the pressure of the products issuing from the reaction coil. Vaporization of the products takes place in the fractionator, leaving as a residual, tarry material in the bottom thereof, which may be withdrawn through line 27 controlled by valve 28 into a tar stripper 29 where the pressure may be reduced. Any light or intermediate fractions condensed with the tar are revaporized in the stripper 29 and passed overhead through line 31 and condenser 33 into the tank 35. Residue may be withdrawn from the stripper through line 36. The condensate is withdrawn from tank 35 through line 37 by means of pump 39, and a portion thereof recycled through the line 41 to the top of the stripper 29 to act as reflux. The remainder of the condensate withdrawn from the tank 35 is pumped through the line 43 to the arrester 21 by means of pump 45 through line 47 controlled by valves 49 and 51.

The vaporized portions in the fractionator 25 are partially condensed to separate the fraction heavier than gasoline on the plate 53 and to separate naphtha and gasoline boiling point distillates on the plates 55 and 57. Condensate from the plate 53 is withdrawn from the tower through the line 59 and a portion thereof may be recycled to the bottom of the tower as reflux through line 61 controlled by valve 63. The remainder of the condensate withdrawn through line 59 may be charged by means of the pump 65, either through line 67 controlled by valve 69, line 70, lines 71 and 72 controlled by valves 71' and 72' respectively, heat exchangers 3 and 73, lines 74 and 75, heat exchanger 76, cooling coil 77 where the condensate is cooled to a temperature of 100° F. or lower, and lines 79 into the upper portion of an absorber tower 81; or the valve 69 may be closed and the condensate passed through line 82 and reboiler 83 back to line 70. In reboiler 83 the condensate passes in indirect heat interchange with the lighter distillate to impart heat thereto. It will be apparent that part of the condensate may be by-passed around the reboiler and a part passed through it.

Naphtha or gasoline boiling point condensates are withdrawn from the plates 55 and 57 of the fractionating tower 25 through either line 84 or 85 controlled by valves 86 and 87 respectively, and charged through line 89 to the upper portion of a stabilizing tower 91. The liquid from the stabilizer 91 passes through line 93 to the reboiler 83 back to the stabilizer through line 95. Additional heat is imparted to the condensate in the reboiler, sufficient to eliminate the unstable constituents such as butylene, butane, propylene, etc. The stabilized distillate is withdrawn from the tower 91 through the line 97 and either passed to storage or subjected to suitable refining. Gases and light fractions pass overhead from the stabilizer through the line 99 back to the upper portion of the fractionator 25.

The light vapors and gases which are not condensed in the fractionator 25, pass over the top thereof through line 101 controlled by valve 102, heat exchanger 103, line 105, and condenser 107 where the gases are cooled to a temperature of 100° F. or less, and then into the gas and liquid separator 109. This separator 109 is preferably maintained at a pressure of from atmospheric to 300 pounds per square inch. When tower 25 is operated at low pressures, it will be necessary to insert a by-pass and compressor in line 105 in order to bring the gases up to sufficient pressure before entering the separator 109. A large portion of the heavier constituents in the gas, such as butane, butylene, propylene, and propane, will condense in the separator and are withdrawn therefrom through line 110 by means of pump 111. A portion of the condensate may be withdrawn from the separator 109 by means of pump 112 through line 113, line 114, and/or line 115 as reflux to the tower 25 and/or the stabilizer 91. The uncondensed gases such as hydrogen, methane, ethane, ethylene, and some propane and propylene, and a small part of the butane and butylene, are withdrawn from the top of the separator through the line 116 and returned to the lower portion of the absorber 81, where they pass in counter-current contact with cool oil introduced into the upper portion of the absorber through line 79. If the pressure on the gases leaving separator 109 is too low, a compressor may be connected in the line 116 to bring the gases to suitable pressure for the absorption step. However, the invention contemplates a process in which the gases leaving the separator 109 are under sufficient pressure to avoid the necessity of compressing them. The absorber is preferably maintained under a pressure of approximately 100–300 pounds per square inch gauge. Any gases which are not dissolved in the absorber pass over through the line 117 controlled by valve 119 and may be eliminated from the system. The rich oil from the bottom of the absorber 81 is withdrawn through line 120 and is charged to the arrester 21 together with condensate from line 43. Instead of pumping the rich oil from the absorber and the condensate from line 43 directly to the arrester, they may be by-passed through line 131 and heat exchanger 76 where they assist in cooling the heavy condensate passing from the fractionator 25 to the absorption tower 81, and then passed back to line 47 through line 133; or the stream may be split and only part passed through the exchanger.

The liquefied gases in the separator 109 are withdrawn therefrom through line 110 by means of pump 111 and pass through heat exchanger 103 where they are heated by indirect exchange with vapors from fractionator 25, passing through line 121, heat exchanger 73 where they are further heated by indirect exchange with heavy condensate from fractionator 25, and then passing through line 125, to the inlet of a heating coil 127 preferably located in the convection heat zone of the furnace 9. The gases are heated in the heating coil 127 to a coil outlet temperature ranging from 500°–1000° F., and preferably from 600°–950° F., under a coil outlet pressure of from atmospheric to 400 pounds per square inch gauge. The gases leave the heating coil 127 through the line 129 and join the hot cracked gases from the line 11 and are further heated thereby to a temperature of from 900°–1200° F., and preferably to a temperature of 1075°–1175° F. The mixed gases then pass to the reaction coils 15 where conversion of the gases to liquids takes place. It will be apparent that the gas may be fed to the reaction coils through any one of the several lines 17 or the stream may be split and fed through any number of lines simultaneously. By providing several inlets to different portions of the reaction coil, the reaction time can be varied as desired to suit the particular conditions of olefin concentration, temperature, and pressure of the gases entering the reaction zone. At the temperatures and pressures to which the gases are preferably subjected in the reaction coil, a reaction time of from 5 to 30 seconds is sufficient to accomplish the desired amount of conversion.

Under the conditions of temperature and pressure at which my invention is preferably carried out, a high octane motor fuel can be produced without the use of excessive temperatures or pressures and with high yields. Although the system is particularly adapted to treatment of natural gas and low olefin-containing gases from high pressure cracking processes, hydrocarbon gases from any other source may be processed.

What I claim is:

1. The method which comprises subjecting hydrocarbon gases in a reaction zone to a condition of time, temperature and pressure suitable for converting a substantial portion thereof to gasoline boiling hydrocarbons, fractionating the reaction products into residue, intermediate condensate, light condensate and gas, separating the gas into a liquid and a gaseous portion, passing said liquid portion in heat interchange with gases and intermediate condensate from the fractionating zone and thereafter charging said liquid portion to a preheating zone wherein it is heated to a temperature below the reaction temperature, charging the gases leaving the preheating zone to said reaction zone, passing intermediate condensate from the fractionating zone in heat interchange with the first mentioned gases prior to charging to said reaction zone and thereafter charging said intermediate condensate to an absorption zone, contacting said gaseous portion countercurrently with said intermediate condensate in said absorption zone, withdrawing rich condensate from said absorption zone and passing it in heat interchange with condensate passing to said absorption zone and thereafter mixing said rich condensate with the aforesaid reaction products.

2. The method which comprises passing predominantly saturated hydrocarbon gases successively through a heating and cracking zone and a reaction zone, cooling the reaction products leaving the reaction zone by direct contact with hydrocarbon liquid, fractionating the resulting mixture into residue, intermediate condensate, light condensate and gases, separating the gases into a liquid and gaseous portion, passing said liquid portion in heat interchange with gases and intermediate condensate from the fractionating zone and thereafter charging said liquid portion to a preheating zone wherein said portion is heated to a temperature below the desired reaction temperature, mixing the gases leaving the preheating zone with gases issuing from said heating and cracking zone in order to effect partial cooling of the latter, passing intermediate condensate from the fractionating zone in heat interchange with gases charged to said heating and cracking zone and thereafter charging said intermediate condensate to an absorption zone, contacting said gaseous portion countercurrently with said intermediate condensate in an absorber, eliminating unabsorbed gases from the system, withdrawing condensate charged with gases from said absorber and passing it in heat interchange with condensate passing to said absorber, and thereafter charging the condensate with absorbed gases to the outlet of said reaction zone.

3. Apparatus of the character described comprising a heating coil and a reaction means connected thereto by a connecting line, a second heating coil connected to said reaction means by said connecting line, a fractionating means connected to the outlet of said reaction means, means for separately withdrawing gasoline, condensate heavier than gasoline, and gases from said fractionating means, means for separating gases leaving said fractionating means into gaseous and liquid fractions, means for recycling said liquid fraction to said second heating coil, means for cooling said condensate, means for contacting said condensate with said gaseous fraction under super-atmospheric pressure, means for charging condensate containing absorbed gases to the outlet of said reaction means and means for charging at least a portion of said last mentioned rich condensate to said fractionating means.

HERMANN C. SCHUTT.